(12) United States Patent
Park et al.

(10) Patent No.: US 10,443,996 B2
(45) Date of Patent: Oct. 15, 2019

(54) LENGTH MEASURING DEVICE AND CONTROL METHOD THEREOF

(71) Applicant: BAGEL LABS CO., LTD., Seongnam-si, Gyeonggi-do (KR)

(72) Inventors: Soo-Hong Park, Seoul (KR); Sung Seek Ham, Seoul (KR); Min Ki Son, Bucheon-si (KR)

(73) Assignee: BAGEL LABS CO., LTD., Seongnam-si, Gyeonggi-do (KR)

( * ) Notice: Subject to any disclaimer, the term of this patent is extended or adjusted under 35 U.S.C. 154(b) by 189 days.

(21) Appl. No.: 15/685,734

(22) Filed: Aug. 24, 2017

(65) Prior Publication Data

US 2018/0073846 A1 Mar. 15, 2018

(30) Foreign Application Priority Data

Sep. 13, 2016 (KR) .......................... 10-2016-0118333
Aug. 14, 2017 (KR) .......................... 10-2017-0103239

(51) Int. Cl.
    *G01B 3/10*     (2006.01)

(52) U.S. Cl.
    CPC ......... *G01B 3/1056* (2013.01); *G01B 3/1005* (2013.01); *G01B 3/1041* (2013.01); *G01B 3/1061* (2013.01); *G01B 3/1082* (2013.01); *G01B 2003/1023* (2013.01); *G01B 2003/1043* (2013.01); *G01B 2003/1069* (2013.01); *G01B 2210/60* (2013.01)

(58) Field of Classification Search
    CPC ... G01B 3/1056; G01B 3/1084; G01B 3/1094

USPC ......................... 33/1 PT, 756, 761, 762, 763
See application file for complete search history.

(56) References Cited

U.S. PATENT DOCUMENTS

| | | | |
|---|---|---|---|
| 4,575,944 A * | 3/1986 | Lin ...................... | G01B 3/1061 250/237 G |
| 4,768,290 A * | 9/1988 | Cooper ................... | G01B 3/11 224/269 |
| 5,035,064 A | 7/1991 | Care | |
| 5,581,901 A * | 12/1996 | Takahashi ............... | A62B 1/06 182/231 |
| 5,743,021 A | 4/1998 | Corcoran | |
| 6,269,547 B1 * | 8/2001 | Chuang .............. | B65H 75/4405 254/338 |

(Continued)

FOREIGN PATENT DOCUMENTS

| CN | 104520665 A | 4/2015 |
|---|---|---|
| CN | 105258587 A | 1/2016 |

(Continued)

*Primary Examiner* — George B Bennett
(74) *Attorney, Agent, or Firm* — Rabin & Berdo, P.C.

(57) ABSTRACT

Provided is a length measuring device having an automatic zero point adjusting function and a control method thereof. The length measuring device includes a line to which a hook part is attached at one end, a case having an opening formed therein, a rotating part to be rotated according to extraction or retraction of the line out of or into the case through the opening, a rotation sensing part which senses a rotation of the rotating part, and a control part which converts an amount of rotation of the rotating part into a length measurement value and resets the converted length measurement value to a predetermined value when the length measuring device is in a first state.

20 Claims, 5 Drawing Sheets

(56) References Cited

U.S. PATENT DOCUMENTS

| | | | |
|---|---|---|---|
| 9,354,031 B1* | 5/2016 | Darr | G01B 3/1084 |
| 2007/0107248 A1* | 5/2007 | Jones | G01B 3/1041 |
| | | | 33/760 |
| 2009/0009360 A1* | 1/2009 | Flannigan | G01B 3/1084 |
| | | | 340/870.03 |
| 2011/0131008 A1* | 6/2011 | Swanson | G01B 5/004 |
| | | | 702/152 |
| 2012/0102773 A1* | 5/2012 | Steinich | G01B 3/1084 |
| | | | 33/701 |
| 2016/0076866 A1* | 3/2016 | Chiu | G01B 3/1084 |
| | | | 33/764 |
| 2018/0120080 A1* | 5/2018 | Park | G01B 7/026 |

FOREIGN PATENT DOCUMENTS

| | | |
|---|---|---|
| CN | 105423837 A | 3/2016 |
| CN | 105806276 A | 7/2016 |
| JP | S60174803 U | 11/1985 |
| JP | S6266101 A | 3/1987 |
| JP | H01500373 A | 2/1989 |
| JP | H07091172 A | 4/1995 |
| JP | H08278120 A | 10/1996 |
| JP | 3383229 B2 | 3/2003 |
| JP | 3143409 U | 7/2008 |
| JP | 2010267580 A | 11/2010 |
| JP | 3194702 U | 12/2014 |
| JP | 2015188675 A | 11/2015 |
| JP | 2016090582 A | 5/2016 |
| KR | 101605473 B1 | 3/2016 |

* cited by examiner

LENGTH MEASURING DEVICE AND CONTROL METHOD THEREOF

TECHNICAL FIELD

The present disclosure relates to a length measuring device and a control method thereof, and more particularly, to a length measuring device having an automatic zero-point adjustment function and a control method thereof.

BACKGROUND ART

Generally, a measuring tape having a tape configuration with length-indicating markings formed on a surface thereof is used for measuring widths or breadths of a certain space, or for measuring sizes, lengths or widths of a measured object.

An electronic measuring tape is also known which, unlike a conventional measuring tape, automatically calculates the extracted length of a tape and displays the calculated result on the display means. However, in the conventional electronic measuring tape, even if the extracted tape is completely rewound, the measured length may not be accurately reduced to '0' depending on the rewound state of the tape. In order to solve this problem, a manual zero adjustment function has been proposed, according to which a user presses a reset button to reset the measurement length to '0'.

SUMMARY

Accordingly, it is an object of the present disclosure to provide a length measuring device for automatically resetting a length measurement value when extracted line is completely rewound and a control method thereof.

The present disclosure has been made in order to solve the technical problems described above, and according to an embodiment of the present disclosure, a length measuring device is provided, which may include a line to which a hook part is attached at one end, a case having an opening formed therein, a rotating part to be rotated according to extraction or retraction of the line out of or into the case through the opening, a rotation sensing part which senses a rotation of the rotating part, and a control part which converts an amount of rotation of the rotating part into a length measurement value and resets the converted length measurement value to a predetermined value when the length measuring device is in a first state.

The length measuring device may further include a hook sensing part for sensing the hook part.

When the hook part is sensed by the hook sensing part, the control part may determine that the length measuring device is in the first state.

The hook sensing part may include a physical switch to be pressed by the hook part when the hook part is hooked in the opening.

The hook sensing part may include a magnetic sensor for sensing a strength of the magnetic field.

The hook part may be made of a material having magnetism or a magnet may be attached thereto.

The control part may determine that the length measuring device is in the first state when the strength of the magnetic field sensed by the magnetic sensor is equal to, or greater than the reference magnetic field strength.

The control part may determine that the length measuring device is in the first state when the strength of the magnetic field sensed by the magnetic sensor is equal to, or greater than a reference magnetic field strength and the converted length measurement value is equal to, or less than a predetermined reference.

The control part may set the reference magnetic field strength based on the strength of the magnetic field measured by the magnetic sensor upon power on of the length measuring device.

When the rotating part is rotated in a retraction direction of the line with a faster speed than the reference rotation speed, the control part may determine that the length measuring device is in the first state.

When the rotating part is rotated in a retraction direction of the line with a faster speed than the reference rotation speed and then the rotating part remains in the stop state for the reference time or longer, the control part may determine that the length measuring device is in the first state.

When the rotating part is rotated in a retraction direction of the line and then the converted length measurement value is equal to, or less than a predetermined reference, the control part may determine that the length measuring device is in the first state.

When the rotating part is rotated in a retraction direction of the line with a faster speed than the reference rotation speed and then the rotating part is in the stop state for the reference time or longer, the control part may determine that the length measuring device is in the first state when the converted length measurement value is equal to, or less than a predetermined reference value.

The length measuring device may further include an inertial sensor part for sensing a movement of the length measuring device.

The control part may determine that the length measuring device is in the first state when the movement of the length measuring device meets a predetermined condition.

According to another embodiment of the present disclosure solving for the technical problems, there is provided a method of controlling a length measuring device, which may include sensing an amount of rotation of the rotating part, converting the amount of rotation of the rotating part into a length measurement value, determining whether the length measuring device is in a first state or not, and resetting the converted length measurement value to a predetermined value, when the length measuring device is in the first state.

According to the present disclosure, it is possible to automatically reset the length measurement value when extracted line is completely rewound.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION OF THE DISCLOSURE

Hereinafter, preferred embodiments of the present disclosure will be described in detail with reference to the accompanying drawings so that those with ordinary knowledge in the art can easily achieve the present disclosure.

Figure 1:
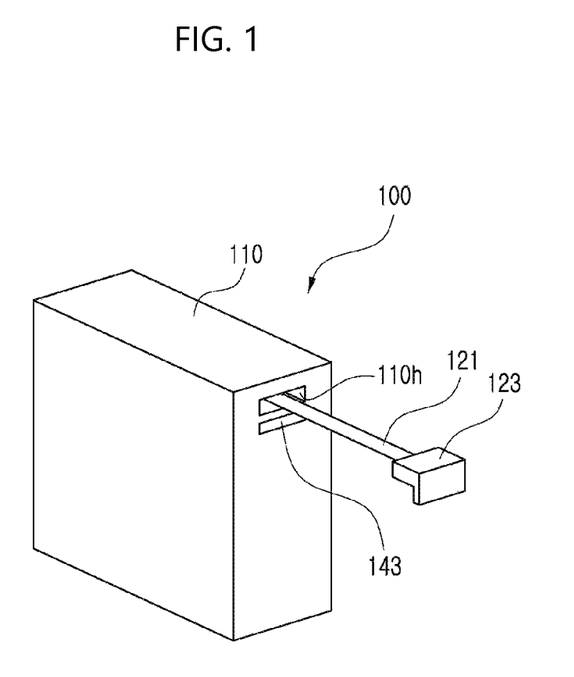
FIG. 1 is a schematic perspective view of a length measuring device according to an embodiment of the present disclosure.
Figure 2:
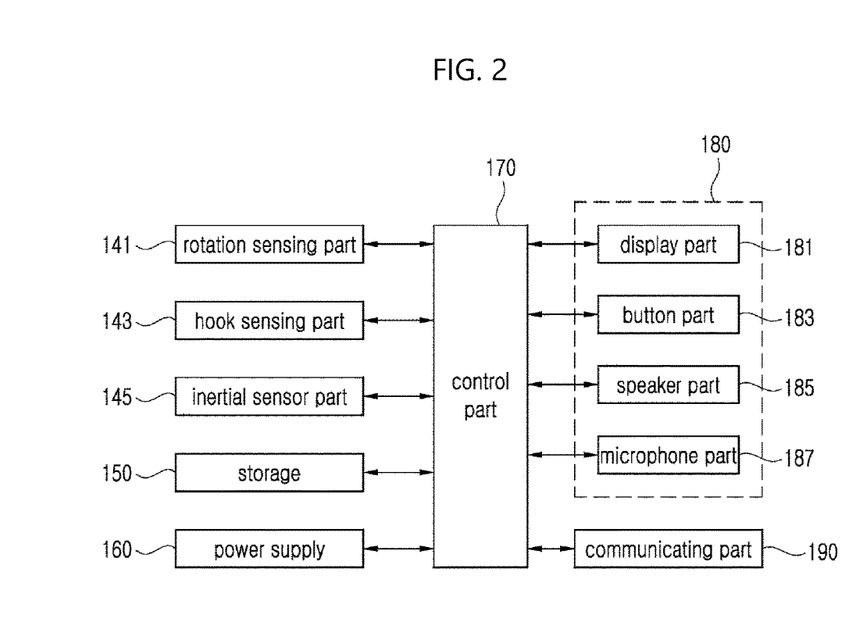
FIG. 2 is a view illustrating electronic components of a length measuring device according to an embodiment of the present disclosure.

FIG. 1 is a schematic perspective view of a length measuring device according to an embodiment of the present disclosure, and FIG. 2 is a view illustrating electronic components of a length measuring device according to an embodiment of the present disclosure.

Referring to FIGS. 1 and 2, a length measuring device 100 according to an embodiment of the present disclosure may include a case 110, a line 121, a hook part 123, a rotation sensing part 141, a hook sensing part 143, an inertial sensor part 145, a storage 150, a power supply 160, a control part 170, an input/output part 180, a communicating part 190, and one or more rotating parts (not shown).

Depending on the embodiment, the length measuring device 100 may not include some of the components illustrated in FIGS. 1 and 2, or may include additional component. For example, the length measuring device 100 according to an embodiment of the present disclosure may further include a component related to remote distance measurement using a laser, an infrared ray, or an ultrasonic wave, etc. The length measuring device 100 may also include a component related to a function of obtaining a length measurement value based on an amount of rotation of a rotating body rotating in contact with the measurement object.

The case 110 performs a function of receiving and protecting therein each of the components of the length measuring device 100. The case 110 may have an opening 110*h* through which the line 121 can be extracted. The shape of the case 110 may vary according to embodiments.

The line 121 may have a form of a string, a tape, and so on. The line 121 may be made of various materials. For example, the line 121 may also be made of a material such as steel, stainless steel, polyethylene fiber, para-aramid synthetic fiber, and so on.

The hook part 123 has a structure that can be hooked in the opening 110*h*. For example, the hook part 123 may have a shape such as "ㄱ" or "ㅜ" which is partially bent vertically.

The line 121 may be extracted out of the case 110 or retracted back into the case 110 through the opening 110*h*, while rotating one or more rotating parts.

When the user pulls the hook part 123 attached to one end of the line 121, the rotating part may be rotated in an extraction direction of the line 121 (hereinafter referred to as 'forward rotation'). Conversely, when the line 121 is retracted into the case 110 through the opening 110*h*, the rotating part may be rotated in a retraction direction of the line 121 (hereinafter referred to as 'reverse rotation').

The rotation sensing part 141 may be implemented as a rotation sensor such as a potentiometer sensor, a rotary encoder, a magnetic rotation sensor, and so on. The rotation sensing part 141 may sense an amount of rotation of the rotating part.

Figure 3:
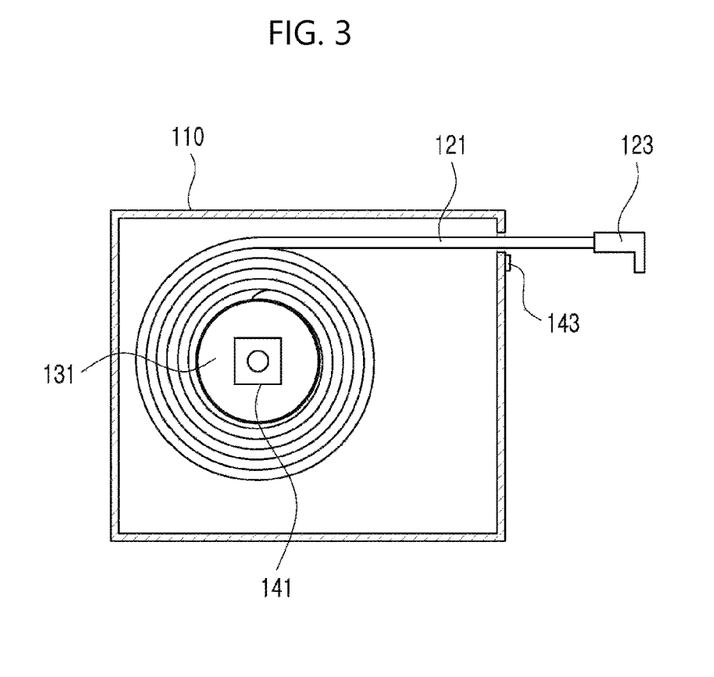
FIG. 3 is a view illustrating a configuration of a rotating part and a rotation sensing part according to a first embodiment of the present disclosure.

FIG. 3 is a view illustrating a configuration of the rotating part and the rotation sensing part according to a first embodiment of the present disclosure.

Referring to FIG. 3, the length measuring device 100 according to an embodiment of the present disclosure may include a first rotating part 131 around which a line may be wound and unwound several times. When the user pulls the line 121, the first rotating part 131 may be rotated in an extraction direction of the line 121. The first rotating part 131 may be provided with an elastic member (not shown) such as a tension spring or a spring, so as to have a restoring force toward a direction to prevent the extraction of the line 121. As a result, when the user finishes the length measurement and releases the hook part 123, the first rotating part 131 may be rotated in a retraction direction of the line 121, thus causing the line 121 to be rewound.

In the embodiment of FIG. 3, the rotation sensing part 141 may sense amount, speed or direction of rotation of the first rotating part 131, and so on. For this purpose, the rotation sensing part 141 may be installed on an axis of rotation of the first rotating part 131.

Figure 4:
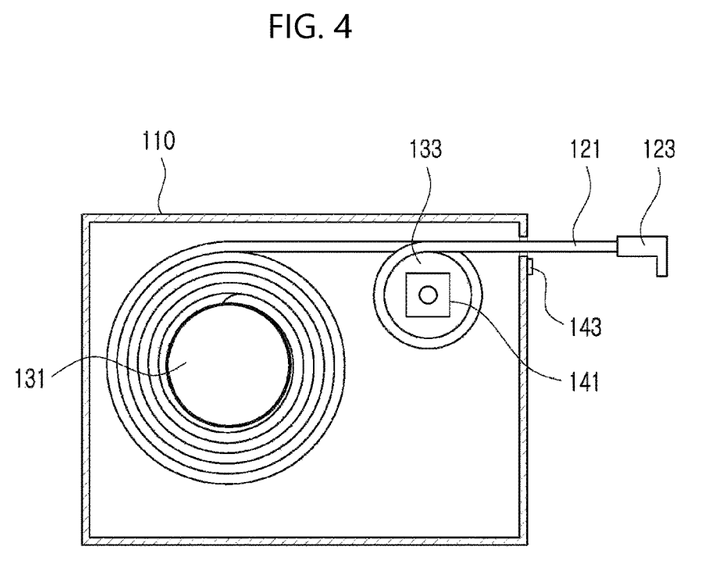
FIG. 4 is a view illustrating a configuration of a rotating part and a rotation sensing part according to a second embodiment of the present disclosure.

FIG. 4 is a view illustrating a configuration of the rotating part and the rotation sensing part according to a second embodiment of the present disclosure.

Referring to FIG. 4, the length measuring device 100 according to the second embodiment of the present disclosure may further include a second rotating part 133 in addition to the first rotating part 131.

The line 121 may be wound on the second rotating part 133 at least once, as illustrated in FIG. 4. The line 121 being retracted or extracted may rotate both the first rotating part 131 and the second rotating part 133 simultaneously.

The first rotating part 131 may have the same structure and operate in the same manner as illustrated in FIG. 3. The rotation sensing part 141 may be installed on the axis of rotation of the second rotating part 133 to sense the amount, speed or direction of rotation of the second rotating part 133, and so on.

Figure 5:
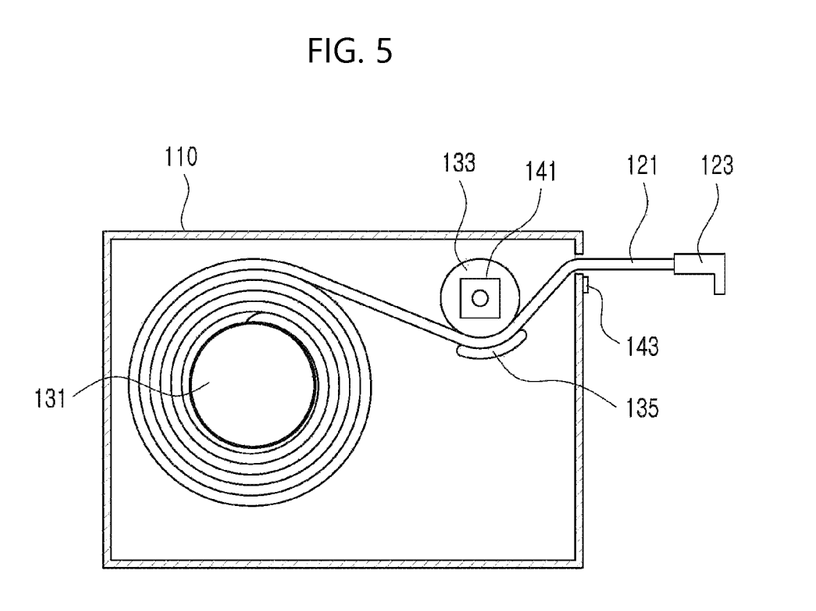
FIG. 5 is a view illustrating a configuration of a rotating part and a rotation sensing part according to a third embodiment of the present disclosure.

FIG. 5 is a view illustrating a configuration of the rotating part and the rotation sensing part according to a third embodiment of the present disclosure.

Referring to FIG. 5, in the length measuring device 100 according to the third embodiment of the present disclosure, the configuration or operation of the first rotating part 131, the second rotating part 133 and the rotation sensing part 141 are the same as those of the second embodiment described above.

However, the line 121 is different from the second embodiment in that it 121 contacts only a portion of the circumference of the second rotating part 133, as illustrated in FIG. 5. The length measuring device 100 may further include a line-guiding part 135.

The line-guiding part 135 performs a function of guiding the line 121 such that the line 121 moves in close contact with the second rotating part 133. While FIG. 5 exemplifies a structure in which the line-guiding part 135 spaced apart from the circumference of the second rotating part 133 is formed corresponding to a portion of the second rotating part 133 in a circumferential direction, and the line 121 is interposed in a space defined between the line-guiding part 135 and the second rotating part 133, the present disclosure is not limited thereto. The line-guiding part 135 may have any structure as long as it serves to guide such that the second rotating part 133 is rotated by the frictional force generated upon retraction or extraction of the line 121.

Referring back to FIGS. 1 and 2, the storage 150 performs a function of storing various programs and data related to the operation of the length measuring device 100.

The power supply 160 may perform a function of supplying power necessary for the operation of each component of the length measuring device 100, and may be implemented as a battery.

The input/output part 180 may perform a function of receiving a command related to the operation of the length measuring device 100 from the user or outputting information related to the operation of the length measuring device 100 to the user.

According to an embodiment, the input/output part 180 may include or partially include a display part 181, a button part 183, a speaker part 185, and a microphone part 187.

The display part 181 may perform a function of visually displaying information related to the operation of the length measuring device 100. For example, the display part 181 may visually display a length measurement value, and for this purpose, may be implemented as a display module such as LED, LCD, OLED, etc.

The button part 183 may perform a function of receiving various commands related to the operation of the length measuring device 100 from a user.

The speaker part 185 may perform a function of outputting information related to the operation of the length measuring device 100, for example, a length measurement value by sound.

The microphone part 187 may perform a function of receiving various commands or information related to the operation of the length measuring device 100 from a user by voice.

The communicating part 190 may support exchange of various information and data between the length measuring device 100 and an external apparatus with wired or wireless communication method. In an example, the wired communication method may include a communication method using a universal serial bus (USB) cable and so on, and the wireless communication method may include short distance communication method such as Wi-Fi, bluetooth, zigbee, Infrared Data Association (IrDA), Ultra Wideband (UWB), Radio Frequency Identification (RFID), NFC, and so on, or mobile communication method such as 3rd Generation (3G), 4th Generation (4G), or Long Term Evolution (LTE), and so on.

The control part 170 controls the overall operation of the length measuring device 100.

The control part 170 may obtain a length measurement value corresponding to a distance by which the line 121 is extracted. To this end, the control part 170 may convert the amount of rotation of the first rotating part 131 or the second rotating part 133 sensed by the rotation sensing part 143 into a length measurement value.

The control part 170 may convert the amount of rotation sensed by the rotation sensing part 143 into a length measurement value according to a predetermined algorithm. Alternatively, the control part 170 may convert the amount of rotation sensed by the rotation sensing part 143 into a length measurement value using a table in which the amounts of rotation and the length measurement values are associated with each other.

The control part 170 may reset the length measurement value to a predetermined value (e.g., 0), when the length measuring device 100 is in a state in which the line 121 is completely rewound.

The control part 170 may determine whether the line 121 is completely rewound or not, using the hook sensing part 143.

When the line 121 is completely rewound, the hook part 123 is hooked in the opening 110h. Accordingly, when sensing the hook part 123 through the hook sensing part 143, the control part 170 may determine that the line 121 is completely rewound.

The hook sensing part 143 may be disposed around the opening 110h so that the hook sensing part 143 may sense it when the hook part 123 approaches the opening 110h. The hook sensing part 143 may be implemented as a physical switch or a magnetic sensor.

An example will be described below, in which the hook sensing part 143 is implemented as a physical switch.

When the physical switch is pressed by the hook part 123, the control part 170 may determine that the line 121 is completely rewound. In addition, the control part 170 may automatically reset the length measurement value to '0'. The physical switch may have an elastic member or a damper member for reducing an impact on a portion that comes into contact with the hook part 123.

Another example will be described below, in which the hook sensing part 143 is implemented as a magnetic sensor.

The hook part 123 may be made of a material having magnetism or may be attached with a magnet so that it 123 may be sensed by the hook sensing part 143. The magnetic sensor may be implemented as a sensor for sensing a magnetic field such as a magneto resistance sensor or a hall sensor, and so on. As the hook part 123 approaches the opening 110h, the strength of the magnetic field sensed by the magnetic sensor is increased. Accordingly, when the magnetic field corresponding to, or exceeding a reference magnetic field strength is sensed by the hook sensing part 143, the control part 170 may determine that the line 121 is completely rewound. In addition, the control part 170 may automatically reset the length measurement value to '0'. The reference magnetic field strength may be set with a value that is sufficient to determine that the line 121 is completely rewound.

According to an embodiment, the reference magnetic field strength may be reset each time, based on the strength of the magnetic field sensed by the hook sensing part 143 upon power on of the power of the length measuring device. The magnetic field strength measured upon power on may be directly set as the reference magnetic field strength, or alternatively, a value slightly less than the measured magnetic field strength may be set as the reference magnetic field strength. Accordingly, even when the strength of the magnetic field generated in the hook part 123 weakens due to magnet deterioration with time or the like, it is possible to accurately sense it when the hook part 123 is positioned in a predetermined range.

Meanwhile, the physical switch may be depressed by a factor other rather than the hook part 123. Further, when there is another magnet near the length measuring device 100, a magnetic field greater than the reference magnetic field strength may be sensed even if the hook part 123 is not actually hooked in the opening 110h. In this case, a malfunction may occur, in which the line 121 is not completely rewound, but the control part 170 nevertheless resets the length measurement value.

Thus, the control part 170 may be implemented to reset the length measurement value when the physical switch is pressed or when it 170 senses the reference magnetic field strength or higher, if the physical measurement is less than a predetermined reference.

Meanwhile, according to an embodiment, It is also possible that the length measurement device determines whether the line 121 is completely rewound or not based on the speed and direction of rotation of the first rotating part 131 or the second rotating part 133 sensed at the rotation sensing part 141.

When the user releases the extracted line 121, the first rotating part 131 may automatically rewind the line 121 while rapidly rotating in a retraction direction of the line 121. When the line 121 is completely rewound, the first rotating part 131 ceases rotation and stops. Therefore, it is possible to determine whether the line 121 is completely rewound or not, using the rotation information such as the rotation speed, the rotation direction, and the like of the first rotating part 131.

It is practically difficult for a user to grab the rewinding line 121 and stop the first rotating part 131 from rotating, because the speed of rewinding will be too fast once the user releases the extracted lines 121. Accordingly, when the line is retracted with a faster speed than a predetermined speed (condition 1) of the first rotating part 131, it may be determined that the line 121 is completely rewound. In an example, the predetermined speed may be set to be any value as long as it can indicate that the line 121 is automatically rewinding when the user releases the line 121.

Meanwhile, in one implementation, when the first rotating part 131 is rotated in the retraction direction of the line with a faster speed than the predetermined speed and then remains in the stop state for the reference time or longer (condition 2), it may be determined that the line 121 is completely rewound.

Meanwhile, in another implementation, after the first rotating part 131 is rotated in the retraction direction of the line 121, when the converted length measurement value is less than a predetermined reference (condition 3), it may be determined that the line 121 is completely rewound.

It is possible to also determine that the line 121 is completely rewound, when both condition 2 and condition 3 are met (condition 4).

Likewise, it is possible to also determine whether the line 121 is completely rewound or not, using the rotation speed and rotation direction of the second rotating part 133.

The inertial sensor part 145 may include at least one of an acceleration sensor, a gyro sensor, and a geomagnetic sensor, and may measure a movement or a posture of an object. The inertial sensor part 145 may perform a function of measuring a movement, a posture, a movement trajectory, and the like of the length measuring device 100.

Meanwhile, the control part 170 may be implemented to reset the length measurement value according to the movement of the length measuring device 100 sensed by the inertial sensor part 145. For example, an implementation is possible, in which, when the user holds the length measuring device 100 and shakes it with a predetermined intensity or more, the control part 170 resets the length measurement value.

Meanwhile, if the length measurement value is reset to '0' upon a time point of determining the line 121 is completely rewound, the user may recognize it to be rather unnatural. Accordingly, it is possible that the length measurement value may be sequentially reduced to '0' from the value displayed on the display part 181 since the time point of such determination.

Figure 6:
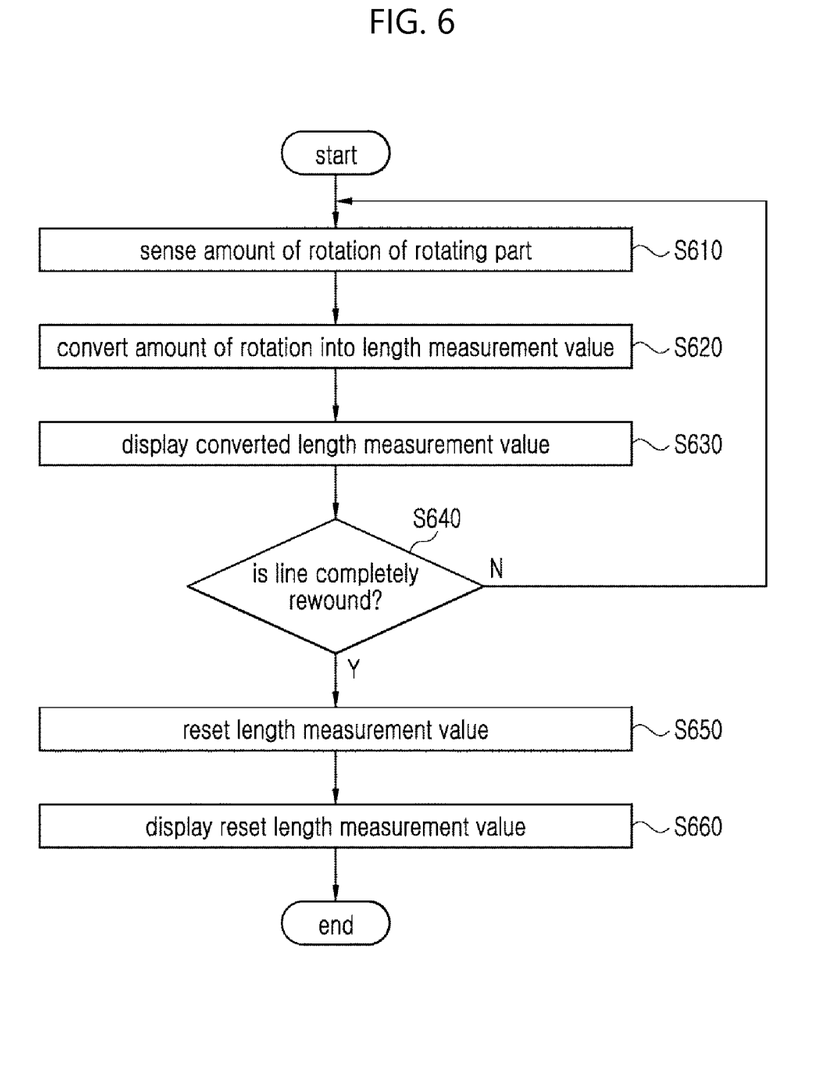
FIG. 6 is a flow chart provided to explain a control method of a length measuring device according to an embodiment of the present disclosure.

FIG. 6 is a flow chart provided to explain a control method of a length measuring device according to an embodiment of the present disclosure.

Referring to FIG. 6, first, the rotation sensing part 141 may sense an amount of rotation of the first rotating part 131 or the second rotating part 133 that is rotated according to the retraction or extraction of the line 121, at S610.

Next, the control part 170 may convert the amount of rotation sensed by the rotation sensing part 141 into a length measurement value, at S620. The control part 170 may display the length measurement value converted at S620 on the display part 181, at S630.

The control part 170 may repeat operations from S610 to S630 and when the length measuring device 100 determines that the line 121 is completely rewound at S640—Y, the control part 170 at S650 may reset the length measurement value converted based on the amount of rotation at S620 to a predetermined value (e.g., 0).

Then at S660, the control part 170 may display the length measurement value reset at S650 on the display part 181.

While the present disclosure has been particularly shown and described with reference to exemplary embodiments thereof, it is to be understood that the disclosure is not limited to the disclosed embodiments, but, on the contrary, is intended to cover various modifications and equivalent arrangements included within the spirit and scope of the appended claims.

The invention claimed is:

1. A length measuring device, comprising:
    a line to which a hook part is attached at one end;
    a case having an opening formed therein;
    a rotating part to be rotated according to extraction or retraction of the line out of or into the case through the opening;
    a rotation sensing part which senses a rotation of the rotating part; and
    a control part which converts an amount of rotation of the rotating part into a length measurement value and resets the converted length measurement value to a predetermined value when the length measuring device is in a first state.

2. The length measuring device of claim 1, further comprising a hook sensing part which senses the hook part,
    wherein the control part determines that the length measuring device is in the first state when the hook part is sensed by the hook sensing part.

3. The length measuring device of claim 2, wherein the hook sensing part comprises a physical switch to be pressed by the hook part when the hook part is hooked in the opening.

4. The length measuring device of claim 2, wherein the hook sensing part comprises a magnetic sensor which senses a strength of a magnetic field, and
    wherein the hook part is made of a material having magnetism or a magnet is attached thereto.

5. The length measuring device of claim 4, wherein the control part determines that the length measuring device is in the first state when the strength of the magnetic field sensed by the magnetic sensor is equal to or greater than a reference magnetic field strength.

6. The length measuring device of claim 5, wherein the control part determines that the length measuring device is in the first state when the strength of the magnetic field sensed by the magnetic sensor is equal to or greater than a reference magnetic field strength and the converted length measurement value is equal to, or less than a predetermined reference.

7. The length measuring device of claim 5, wherein the control part sets the reference magnetic field strength based on the strength of the magnetic field measured by the magnetic sensor upon power on of the length measuring device.

8. The length measuring device of claim 1, wherein, when the rotating part is rotated in a retraction direction of the line with a faster speed than the reference rotation speed, the control part determines that the length measuring device is in the first state.

9. The length measuring device of claim 1, wherein, when the rotating part is rotated in a retraction direction of the line with a faster speed than the reference rotation speed, and then the rotating part remains in the stop state for the reference time or longer, the control part determines that the length measuring device is in the first state.

10. The length measuring device of claim 1, wherein, when the rotating part is rotated in a retraction direction of the line, and then the converted length measurement value is equal to, or less than a predetermined reference, the control part determines that the length measuring device is in the first state.

11. The length measuring device of claim 1, further comprising an inertial sensor part which senses a movement of the length measuring device,
wherein the control part determines that the length measuring device is in the first state when the movement of the length measuring device meets a predetermined condition.

12. A control method of a length measuring device including a rotating part that is rotated according to extraction or retraction of the line out of or into a case through an opening, the control method comprising:
sensing an amount of rotation of the rotating part;
converting the amount of rotation of the rotating part into a length measurement value;
determining whether the length measuring device is in a first state or not; and
resetting the converted length measurement value to a predetermined value, when the length measuring device is in the first state.

13. The control method of claim 12, comprising determining that the length measuring device is in the first state when a hook part attached to one end of the line is sensed by a hook sensing part.

14. The control method of claim 13, comprising determining that the length measuring device is in the first state when a strength of a magnetic field sensed by the hook sensing part is equal to, or greater than a reference magnetic field strength.

15. The control method of claim 14, comprising determining that the length measuring device is in the first state when the strength of the magnetic field sensed by the hook sensing part is equal to, or greater than the reference magnetic field strength and the converted length measurement value is equal to, or less than a predetermined reference.

16. The control method of claim 15, comprising setting the reference magnetic field strength based on the strength of the magnetic field measured by the hook sensing part upon power on of the length measuring device.

17. The control method of claim 12, comprising determining that the length measuring device is in the first state when the rotating part is rotated in a retraction direction of the line with a faster speed than the reference rotation speed.

18. The control method of claim 12, comprising determining that the length measuring device is in the first state when the rotating part is rotated in a retraction direction of the line with a faster speed than the reference rotation speed and then the rotating part remains in the stop state for the reference time or longer.

19. The control method of claim 12, comprising determining that the length measuring device is in the first state when the rotating part is rotated in a retraction direction of the line and then the converted length measurement value is equal to, or less than a predetermined reference.

20. The control method of claim 12, comprising determining that the length measuring device is in the first state when a movement of the length measuring device meets a predetermined condition.

* * * * *